Nov. 20, 1928.  1,692,513
F. B. NEWELL
INDICATOR
Original Filed May 3, 1920    6 Sheets-Sheet 1

Inventor
Floyd B. Newell.

By Walter W. Burns
Attorney

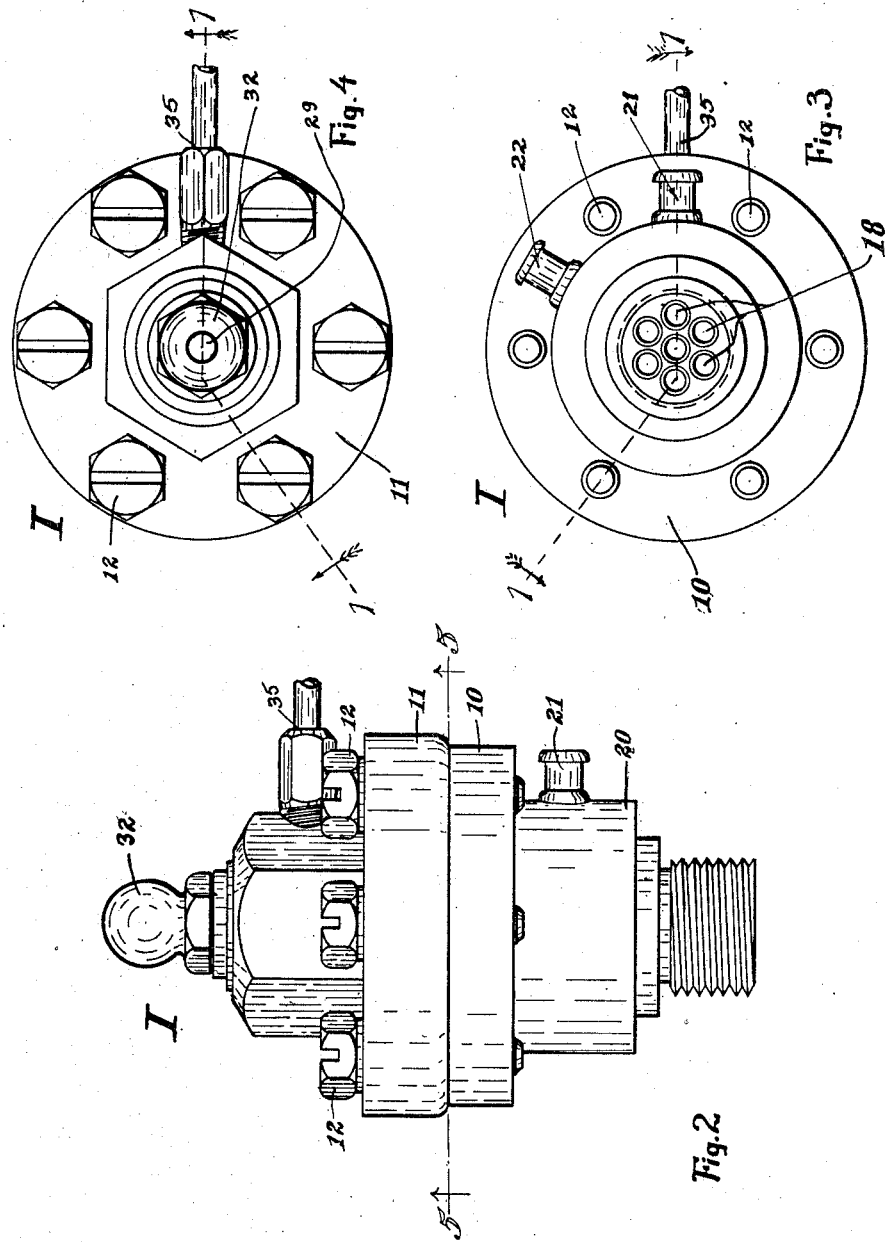

Nov. 20, 1928.    1,692,513
F. B. NEWELL
INDICATOR
Original Filed May 3, 1920    6 Sheets-Sheet 3

Inventor
Floyd B. Newell.
By Walter W. Burns
Attorney

Nov. 20, 1928.                                                     1,692,513
                          F. B. NEWELL
                            INDICATOR
             Original Filed May 3, 1920    6 Sheets-Sheet 4

Inventor
Floyd B. Newell.
By Walter W. Burns
                Attorney

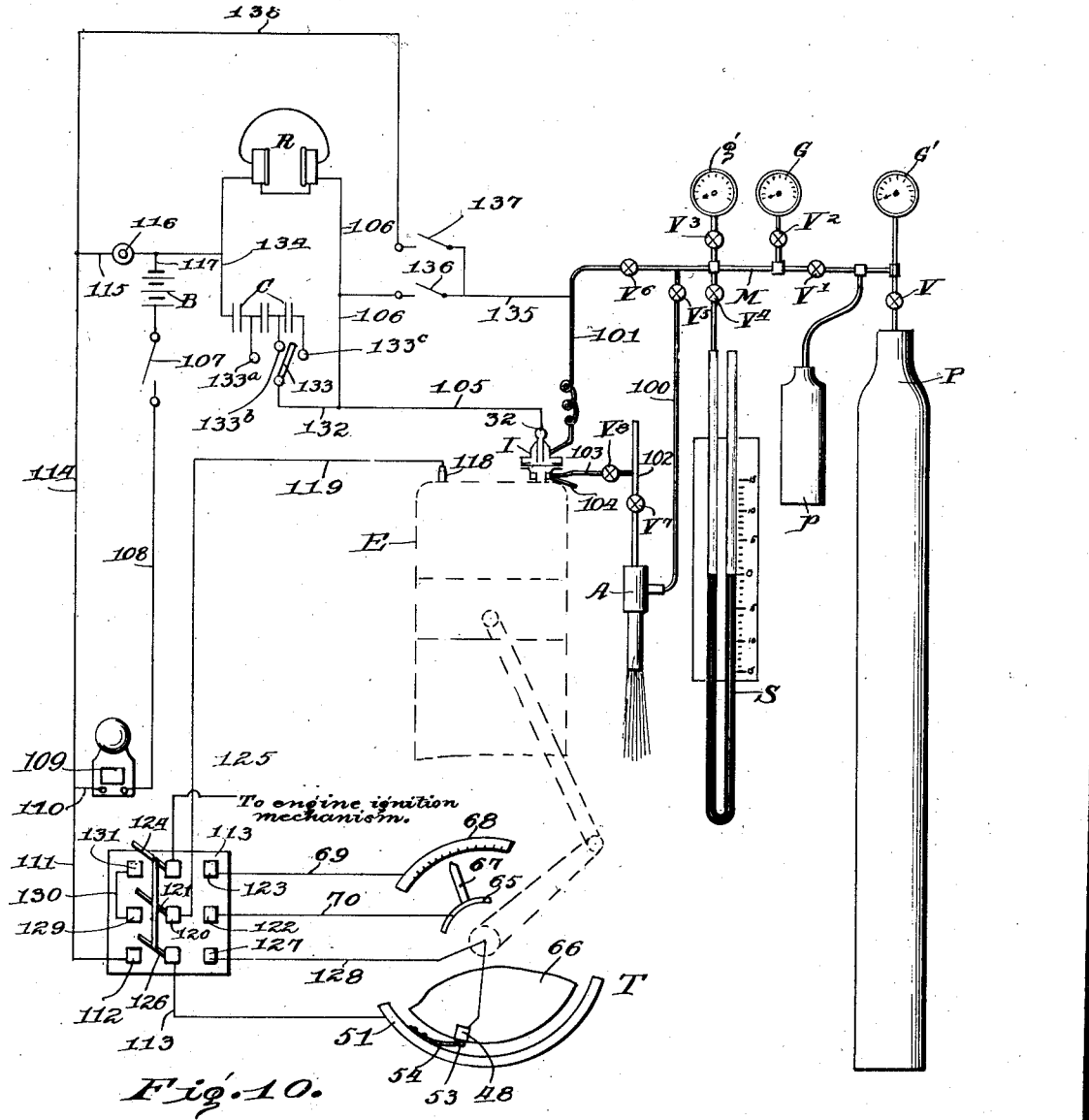

Patented Nov. 20, 1928.

1,692,513

UNITED STATES PATENT OFFICE.

FLOYD B. NEWELL, OF ELMIRA, NEW YORK, ASSIGNOR TO LEOPOLD FREEDMAN AND WILLIAM H. REYNOLDS, COPARTNERS, DOING BUSINESS AS AMERICAN INSTRUMENT COMPANY, OF WASHINGTON, DISTRICT OF COLUMBIA.

INDICATOR.

Application filed May 3, 1920, Serial No. 378,694. Renewed February 12, 1926.

My invention relates to pressure indicators and indicator devices and is adapted for use for measuring the pressure of fluids. Its adaptability extends to the measuring of pressures within pumps and motors as well as to internal combustion motors where pressure is obtained by the burning of gas within the motor itself.

The object of my invention is the provision of an indicator by means of which, the pressure within a chamber may be obtained at any point in the cycle of operation.

Another object is the provision of an indicator by means of which the pressure within a chamber may be obtained at any point within the cycle of operation of a machine of which the chamber is a part or has a cooperative relation.

Another object is the provision of an indicator by means of which pressure may be obtained in a cylinder or other chamber or passage of a high speed motor at any point in the cycle of operation of the motor and regardless of the speed, temperature or pressure of the motor.

Another object is the provision of a device having a balanced pressure member, cooperating means for controlling and determining the pressure on one side of the balanced pressure member and signal operating means coacting with the balanced pressure member for indicating when the pressure is equal on both sides of the balanced pressure member and control means for determining the pressure at any instant during the cycle of a machine.

Another object of my invention is the provision of means which, when the characteristics of an internal combustion motor are being investigated, it is possible to at any time have the point of ignition of a cylinder immediately indicated with relation to the dead center of that cylinder.

Referring to the drawings wherein a preferred embodiment of my invention is illustrated:—

Figure 2 is a side view of the balanced pressure device.

Figure 3 is a bottom view of the structure shown in Figures 1 and 2.

Figure 4 is a top view of the structure shown in Figures 1, 2 and 3.

Figure 10 is a diagrammatic sketch of the whole indicator mechanism.

Like reference characters refer to similar parts throughout the several views.

Figure 1:
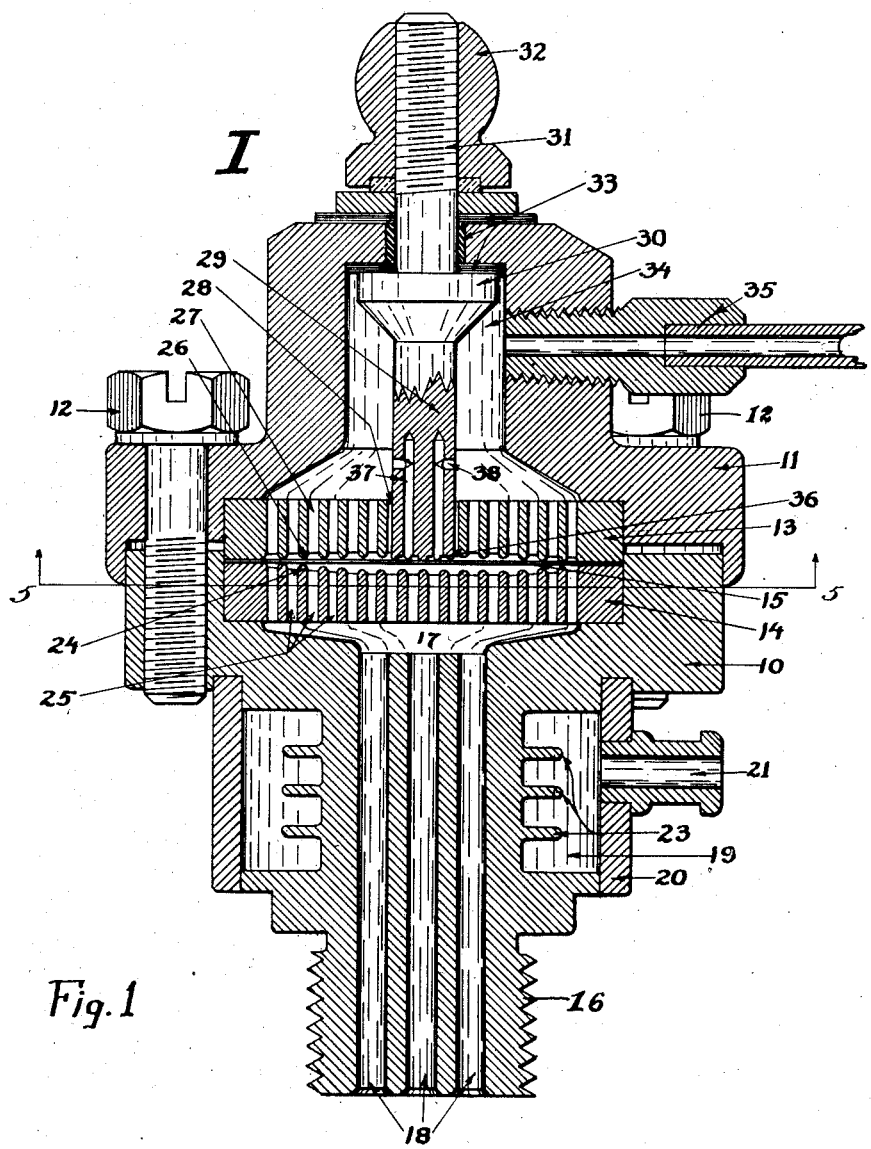
Figure 1 is an enlarged cross sectional view on the line 1—1 of Figures 3 and 4 of the balanced pressure device, the parts being shown very much enlarged in order to more clearly bring out the structural details.
Figure 5:
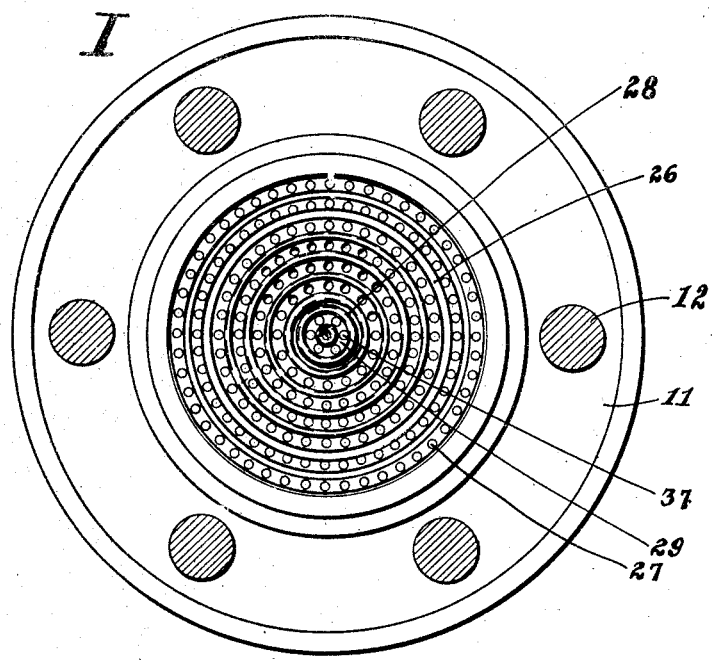
Figure 5 is a cross sectional view on the line 5—5 of Fig. 2.

I designates generally the balanced pressure device. The numeral 10 designates the lower body member and 11 designates the upper body member. These two members are held together by the stud bolts 12. 13 and 14 designate respectively upper and lower diaphragm supports which are located in recesses between the upper and lower body members. Between the diaphragm supports 13 and 14 is firmly held a thin diaphragm 15.

The lower body member is provided with a threaded portion 16 by which it may be threaded in the wall of the chamber, the pressure in which is to be determined.

At the upper end of the body member 10 and below the recess in which the diaphragm support 14 is seated, is a space 17 providing communication with the greater portion of the under side of the diaphragm support 14. Extending from the space 17 to the bottom of the lower body member is a series of passages 18. The lower body member 10 is provided with a cooling water space 19 formed by a turned-out portion of the body member and a sleeve 20. This cooling water space is provided with an inlet tube 21 and an outlet tube 22. Within the water space and forming a part of the body member are annular ribs 23 to provide additional cooling surface for the body portion.

The lower diaphragm support is provided at its outer periphery with a solid portion for support from the body members and to hold firmly the diaphragm. The upper face of the lower support is provided with annular ribs 24. The distance of these ribs below the plane of the outer upper periphery increases as the center is approached. These ribs furnish a support for the diaphragm when a higher pressure is above the diaphragm than the pressure therebelow. In order to furnish pressure communication between the space 17 and the space below the diaphragm, and to equalize the pressure between the ribs 24, holes 25 are provided from the spaces between the ribs to the opposide side of the diaphragm support.

The upper diaphragm support 13 is likewise provided with annular ribs 26 and holes 27 similar respectively to the ribs 24 and the holes 25 in the lower diaphragm support 14. The upper diaphragm support is however provided with a hole 28 through which the electrode 29 extends to make contact with the diaphragm. The ribs 26 of the support 13 are successively farther away from and above the plane of the lower outside portion of the support as the center is approached.

The electrode 29 is provided with an enlarged portion 30 and a threaded portion 31 which latter extends through the upper wall of the upper body member and has a nut 32 screwed thereon for the purpose of securing the same in place and also to furnish an attaching means for the electric connection to be later described. It will be noted that the electrode 29 is insulated at 33 with suitable insulation to prevent electrical contact with the body member. Mica is from its nature a well adapted substance particularly between the inside of the upper body member and the enlarged portion 30 of the electrode. This substance is particularly well adapted for this place since the thin laminæ of which it is composed, make it easy to adjust the lower contacting end of the electrode up and down with relation to the diaphragm. When it is necessary to adjust the end of the electrode nearer to the normal position of the diaphragm, it is only necessary to insert a lamina of mica of thickness equal to the adjustment desired. If it is desired to adjust the electrode away from the normal position of the diaphragm it is only necessary to remove a lamina of thickness equal to the adjustment desired.

Above the diaphragm support and within the upper body portion is a chamber 34 which has communication with the holes 27 of the diaphragm support 13. A duct or tube 35 furnishes a passage for entrance of air or other non-explosive gas under pressure from a source of pressure to be later described and also for exhausting the air or gas from the chamber 34 to control the pressure above the diaphragm 15. The electrode is provided on its contacting end with supporting ribs 36 similar to the ribs of the diaphragm supports 13 and 14. Between these ribs are bored holes 37 which have passages 38 to the chamber 34.

The diaphragm 15 is made of very thin metal usually a few thousandths of an inch thick and is firmly held between the diaphragm supports 13 and 14. The construction of the small ribs 24, 26 and 36 and their proximity to adjacent ribs with the communications to the spaces therebetween make the use of these very thin diaphragms possible.

It will thus be clear that if the pressure within the chamber 17 is the same as the pressure within the chamber 34, there will be no tendency to move the diaphragm 36, either up or down. It will also be clear that when the pressure in the chamber 17 is slightly greater than in the chamber 34, the diaphragm will be moved upwardly, touch the electrode and close an electric circuit to be later described. When however the pressure is slightly greater in the chamber 34 than in the chamber 17, the diaphragm will be forced downwardly against the ribs of the diaphragm support 14 and the connection to the electrode 29 will be broken.

Figure 6:
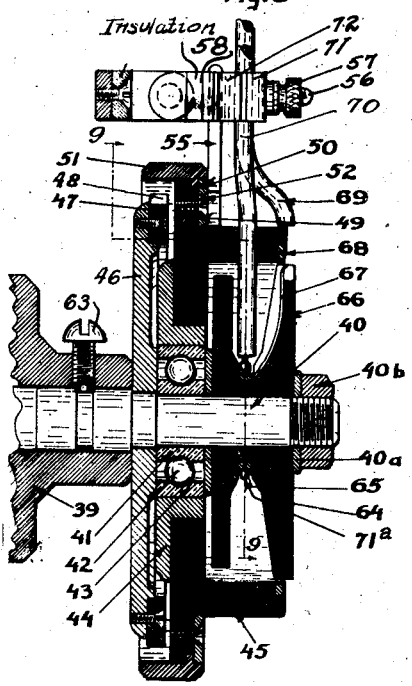
Figure 6 is a cross section of the timer mechanism, the section being taken on the line 6—6 of Figures 7 and 8.
Figure 7:
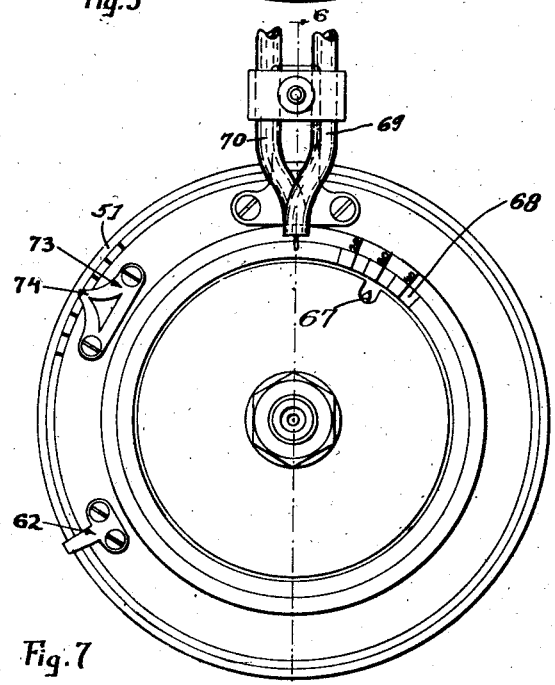
Figure 7 is a front view of the timer mechanism illustrated in Figure 6.

Referring now to Figures 6, 7, 8 and 9, 40 designates the shaft of the timer which is attached at the left hand end in Figure 6 to a shaft of the engine by the adapter 39, the characteristics of which are being investigated. 41 is a bearing on the shaft 40 and upon which the balls 42 are supported. The balls 42 are provided with an outer bearing 43 which is normally stationary and within which the balls 42 and the bearing 41 and shaft 40 turn. The bearing 43 is secured to a metal plate 44 which has secured thereto an annular member 45 which is made of any suitable insulating material such as bakelite. Secured to the shaft 40 and revolving therewith is a plate 46. Secured to the plate 46 at its periphery is a ring 47 of any suitable insulating material as bakelite. This ring has a metallic contact segment in its periphery covering one degree of the circumference thereof, as shown at 48 in Figure 9. This segment 48 is connected to the plate 46 which in turn is connected electrically to the shaft 40 and grounded on the shaft of the engine.

Detachably secured to the annular member 45 at its outer periphery is a ring 49. Between the member 45 and the ring 49 is a groove in which extends a rib 50 of the graduated ring 51. In assembling the parts the rib 50 is placed in its groove after which the ring 49 is put in place and secured by the screws 52. Secured to the inner side of the graduated ring 51 is the contact making brush member 53 (see Figure 9) which is held in contact with the outer periphery of the ring 47 by means of the resilient connecting member 54. It will thus be seen that each time the plate 46 revolves it will be electrically connected, during one degree of its travel, to the graduated ring 51 through the member 54, brush 53, and the segment 48. Extending from the metallic ring 49 which is in contact at all times with the scale ring, is a metallic arm 55 which is in contact with the binding post 56 to which is connected the timer wire in the circuit to be later described.

Figure 8:
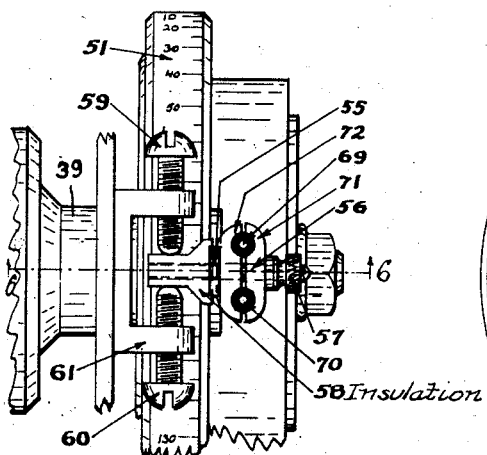
Figure 8 is a detail view of the timer mechanism showing the adjusting means for setting accurately the graduations on the timer with relation to the dead center of the engine to be tested.
Figure 9:
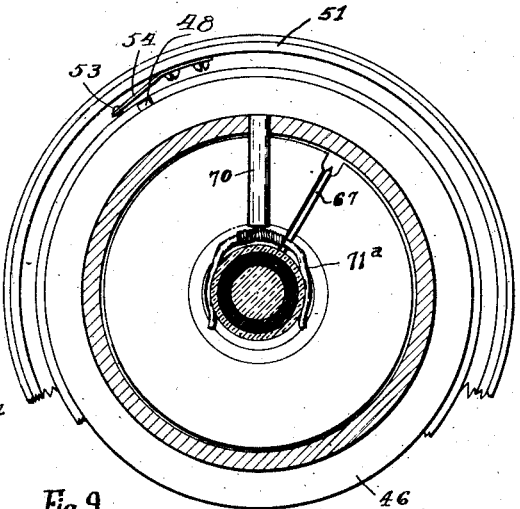
Figure 9 is a detail sectional view on the line 9—9 of Figure 6.

Referring now particularly to Figure 8. The binding post 56 has on one end a thumb nut 57 and its other end extends through the metallic arm 55 and carries an insulating member 58. This insulating member 58 is adjustable between two screws 59 and 60 which are carried by an arm 61 attached to and rigid with the engine frame. Attached to the ring 49 and extending over the scale on the scale ring is a pointer 62. When it is desired to set the timer so that it will read correctly angles with relation to the cycle or the revolution, the following steps are followed: The shaft 40 which is normally held rigidly with relation to the shaft with which it rotates, is loosened as by loosening the set screw 63 in the adapter 39. The engine is now put on dead center, the graduated ring 51 moved so that the pointer 62 points to 0 degrees. The plate 46 is now moved so that the brush 53 is in contact with the segment 48. The set screw 63 is then tightened. After the electric connections, to be later described, are completed and while the engine is still on dead center, the balanced pressure device is short circuited and the telephone set placed on the head. The screws 59 and 60 are now adjusted backwards and forwards until the position of the arm 55 is determined in which it is one half the distance between the points when the current will be broken in each direction as indicated by the snapping of the telephone receiver in the ear. The screws 59 and 60 are left adjusted in this position.

Secured to the shaft 40 is also an insulating spool shaped member 64 which has a metallic ring 65 at its inner smallest diameter as shown in Figure 6. The several elements of the timer are held together by the ring 40$^a$ and the nut 40$^b$ threaded on the end of the shaft 40. Extending up from the ring 65 along the inside of the forward flange 66 of the spool shaped member 64 is an electric conductor 67. This conductor 67 is placed on the spool 64 in a corresponding place to the segment 48 on the ring 47 and is arranged adjacent to a ring 68 which is graduated corresponding to the graduations on the graduated ring 51. From this description it is clear that the conductor 67 is adjacent a graduation on the ring 68 which corresponds to the number of degrees made by the crank with relation to its dead center position. This is literally true when the timer shaft operates with the crank shaft of the engine. When the timer is mounted on the cam shaft of a four cycle engine this relation can be determined by bearing in mind the fact that the cam shaft makes one revolution for each two revolutions of the crank shaft.

A conductor 69 is attached to the ring 68 and another conductor 70 extends down to the ring 65 where it has a brush member 71$^a$ for making contact therewith. The conductors 69 and 70 are heavily insulated and pass up through holders 71 and 72 which are held in place by the binding post 56 and its thumb nut 57. These conductors 69 and 70 are connected in series with the spark plug connection and are so arranged that they may be switched off at will. When switched on, a spark will be seen at the point on the graduations of the ring 68 at which the ignition is occurring. In this way the exact point of ignition may be determined at any time.

Secured to the ring 49 is a detent member 73 which has a notch engaging edge 74 which engages notches in the edge of the graduated ring 51. These notches enable the operator to readily shift the graduated ring 51 to the exact position desired and holds the ring 49 in adjusted position until the next change is desired.

Referring now particularly to Figure 10 I will describe the arrangement and operation of the indicator mechanism and connections as a whole.

I designates generally the balanced pressure device; P the high pressure supply reservoir; $p$ the low pressure supply reservoir; G the high pressure gauge indicating pressures to, say one thousand pounds; $g$ the low pressure gauge indicating pressures from say, atmosphere to one hundred pounds above atmosphere and S the gauge for registering pressures from say, fourteen pounds below atmosphere to fifteen pounds above atmosphere. A is an aspirator to furnish a suction in the pipe 100.

Several valves are used to permit and prevent the passage of air in order to control the admission of air to the several pipes and gauges and to control the pressure to be admitted to the chamber 34 from the reservoir $p$ and the aspirator A. The valve $V_1$ is provided to admit pressure from the source of pressure $p$ to the main pipe line M. $V_2$ is a valve controlling the admission of pressure to the gauge G which is used for the high pressures, $V_3$ a valve which controls the admission of pressure to the gauge $g$ for indicating the medium pressures, $V_4$ the valve to control admission to the gauge S, which in the present case is shown as a mercury manometer. $V_5$ designates the valve which controls the exit of the gas under pressure from the main M, and also serves to conduct the air out through the aspirator A when it is desired to reduce the pressure in the main pipe line M below atmospheric pressure. A valve $V_6$ connects the main pipe line M to a pipe 101 which is connected at its other end to the chamber 34 of the device I.

The aspirator A is of any suitable type and is connected to a water supply pipe 102 which water supply is controlled by a valve $V_7$. A valve $V_8$ controls the supply of water to the cooling water space 19 of the indicator through the pipe 103. The exhaust water from the device I is conducted away by the pipe 104.

The machine being tested, an internal combustion motor for example is designated at E. The timer is designated at T and is illustrated diagrammatically, the reference characters thereon referring to similar parts in the figures, disclosing the details of the timer.

Connected to the electrode nut 32 is a wire 105 which connects by a wire 106 to a telephone receiver R, and thence by a battery B, a switch 107, wire 108, bell 109, wire 110, wire 111 to a terminal 112 on a switch block 113. The switch block 113 carries a three pole double throw switch connected as shown and as hereinafter described.

When the switch is thrown to the left, connection is made through the wire 113' to the graduated ring 51, resilient member 54, brush member 53 and the segment 48 which is grounded on the engine itself.

A signal circuit is provided to signal from the operator to the person making the changes in the timer settings. This circuit is as follows: From the battery B, the switch 107, wire 108, bell 109, wires 110, 114, 115 to the push button 116, wire 117 to the battery. Thus when the button 116 is pressed, the bell 109 is operated in the well known manner. In describing the telephone receiver circuit it was stated that the current passed through the bell. However the current is very light and insufficient to operate the armature of the bell magnets.

The circuit which controls the ignition indication is also connected through the switch on the block 113. When it is desired to determine the point of ignition, the switch is thrown to the right. The circuit made by this operation is as follows: From the spark plug 118 by the wire 119, to the terminal 120, the switch 121, terminal 122 and the wire 70 to the ring 65 and the conductor 67. The outer end of the conductor 67 is adjacent the ring 68 as already described. The spark jumps the gap between the two conductors and indicates the point on the graduated ring 68 where the spark occurs with relation to the revolution of the engine. The current follows the terminal 123, the switch member 124, wire 125 to the ignition controlling mechanism of the engine. When the switch is in this position, the switch member 126 contacts with the terminal 127 which is connected by the wire 128 to the engine frame. This short circuit of the engine frame and the graduated ring 51 prevents any condenser action on the part of the same with the other parts of the timer.

When the switch is thrown to the left the ignition indicator device is taken out of the ignition circuit and the connection made from the terminal 120 through the switch 121, terminal 129, wire 130, terminal 131, switch 124 to the wire 125 and to the engine ignition mechanism.

A condenser C with one or more sections is connected across the telephone receiver R as by the connection 134. The switch 133 is moved to one of the contact points $133^a$, $133^b$, $133^c$ depending upon the effect desired in the receiver R.

A short circuit connection is provided for the circuit closer as follows: From the engine frame E, the circuit closer body, the pipe 101, connection 135, switch 136 to the connection 106. A short circuit connection for the indicator timer is provided as follows: From the pipe 101, connection 135, switch 137, wire 138 which latter connects to the telephone receiver by the wires 114 and 110, bell 109, wire 108, switch 107, battery B and wire 117. These short circuit connections are very useful in detecting trouble in the connections and the timer short circuit is useful in determining the maximum pressure of the cylinder.

A gauge G' may be provided above the main pressure reservoir P to determine the pressure in the small reservoir $p$. The valve V is used to control the pressure in the reservoir $p$ from the reservoir P.

Let us assume that the timer T is connected to the cam shaft of a gasoline engine for example and that it is adjusted as hereinbefore described, on dead center so as to read 0° and is set to close the circuit at this point. The engine, having previously been running, is warm and ready to test.

The balanced pressure device is placed in its tapped hole and the piping connected as shown in the drawing. The water valves $V_7$ and $V_8$ are turned on. These supply water to the cooling water space 19 of the balanced pressure device by the pipe 103 and also to the aspirator by the pipe 102. The telephone receiver R is connected as already described.

Within the balanced pressure device the pressure on the diaphragm forces the same up against the upper diaphragm support 13 and the electrode 19. This closes the circuit to the telephone receiver and causes a "click" to be heard from the receiver.

Assuming that valves $V_1$, $V_3$, $V_4$ and $V_5$ are all closed and that the valves $V_2$ and $V_6$ are open. If now, valve $V_1$ is slowly opened, and a "click" is heard in the receiver while the gauge G registers less than one hundred pounds, the valve $V_3$ is opened to connect the medium pressure gauge. This medium pressure gauge gives more accurate readings. Now with one hand on the valve $V_5$ and the other hand on the pressure valve $V_1$ the pressure in the pipe M and consequently in the chamber 34, can be controlled. By manipulating the valves $V_1$ and $V_5$ to raise and lower the pressure in the chamber 34, the point can be determined at which the clicking in the receiver will either commence or cease. The gauge reading at this particular time gives the pressure within the cylinder at the particular time when the circuit is completed by the timer. This reading is recorded together with the angular reading of the indicator timer. When the timer is connected to the crank shaft as in the present case, a series of readings with a change of say 10° for each successive reading is taken throughout the 360° of the timer graduations. In addition another set, should be taken, of the pressure of points at which the double clicking ceases (or commences). The double clicking takes place because the crank shaft makes two revolutions for each cycle.

In case it is found that with the valve $V_1$ closed and the valve $V_5$ open, no clicking is obtained, a sub-atmospheric pressure is indicated. In this case the manometer valve $V_4$ is opened and the pressure allowed to drop in the pipe line, by opening the valve $V_5$. In order to raise the pressure, the valve $V_1$ is again opened until the desired pressure is obtained.

In testing some internal combustion motors it is desirable to connect the timer to the cam shaft which makes but one revolution during a cycle. In this case no "double clicking" is observed. This feature makes the cam shaft a more desirable place to attach the timer. There is however the disadvantage that since the brush 54 contacts with the contact segment 48 during 1° of the circumference of the timer it contacts during 2° of the revolution of the crank shaft. This causes less accuracy than when the timer is attached to the crank shaft.

Figures 11, 12:
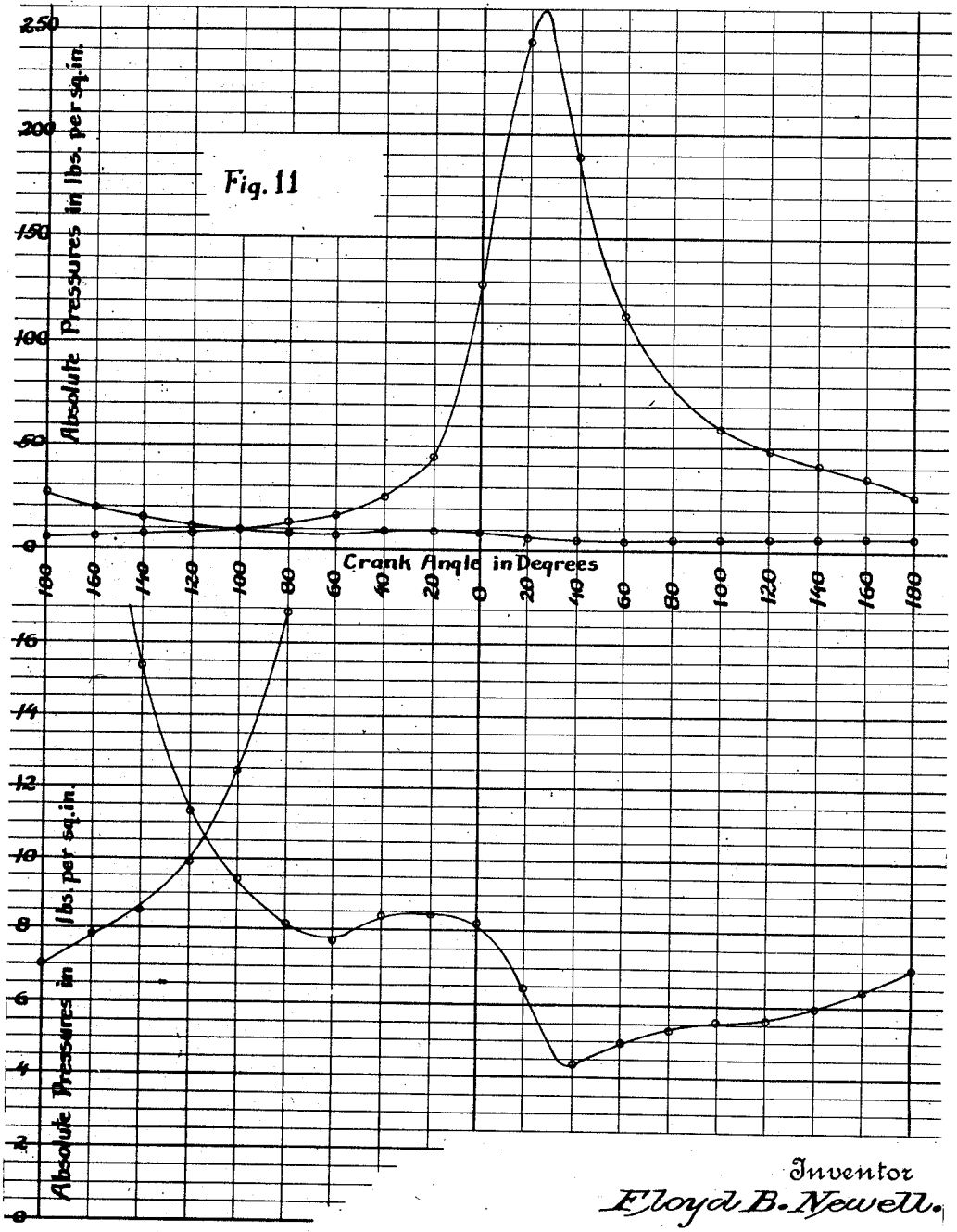
Figure 11 is a view showing curves made by plotting degrees of crank angle as abscissæ and absolute pressure in pounds per square inch as ordinates.
Figure 12 is a curve similar to that of Figure 11 except that a larger scale of ordinates is used.

When the readings of pressure are plotted as ordinates and the crank angle or cycle angle as abscissæ as shown by Figures 11 and 12, the plotted points may be connected by a smooth curve. This curve gives the relation of pressure to rotation. If now these points be plotted with relation to the rectilinear movement of the piston, a pressure-volume curve may be obtained from which the indicated horse power may be determined.

While I have described the preferred form of my invention in detail, I desire to have it understood that various modifications and changes may be made without departing from the spirit of the invention and within the scope of the appended claims.

Having described my invention, what I claim is:

1. In an indicator, a body portion, diaphragm supporting means therein, a diaphragm held by said supporting means, the supporting means being provided with closely spaced ribs upon which the diaphragm will rest when pressure on its opposite side tends to force it out of its plane, said body portion having a pressure chamber on each side of the diaphragm adjacent a support and in communication with the respective side of the diaphragm.

2. In an indicator, a body portion, diaphragm supporting means therein, a diaphragm held by said supporting means, the supporting means being provided with closely spaced ribs upon which the diaphragm will rest when pressure on its opposite side tends to force it out of its plane, said body portion having a pressure chamber on each side of the diaphragm adjacent a support and in communication with the respective sides of the diaphragm said supporting means having communication between the chambers and the spaces between the ribs of the respective supports.

3. In an indicator, a body portion, diaphragm supporting means therein, a diaphragm held by said supporting means, the supporting means being provided with closely spaced ribs upon which the diaphragm will rest when pressure on its opposite side tends to force it out of its plane, said body portion having a pressure chamber on each side of the diaphragm adjacent a support and in communication with the respective sides of the diaphragm said support having communication between the chambers and the spaces between the ribs of the respective supports and an indicator controlling element on one side of the diaphragm in position to be engaged by the diaphragm when the pressure is greater on the opposite side.

4. In an indicator, a body portion, diaphragm supporting means therein, a diaphragm held by said supporting means, the supporting means being provided with closely spaced ribs upon which the diaphragm will rest when pressure on its opposite side tends to force it out of its plane, said body portion having a pressure chamber on each side of the diaphragm adjacent a support and in communication with the respective sides of the diaphragm said support having communication between the chambers and the spaces between the ribs of the respective supports and an insulated electric contact element on a side of the diaphragm in position to be engaged by the diaphragm when the pressure is greater on the opposite side.

5. In an indicator a two part body portion, complementary diaphragm supporting means therein, a diaphragm held between the supporting means, the supporting means having their respective sides, which are adjacent the diaphragm, provided with ribs and having perforations extending from the spaces between the ribs of the respective supporting means to the opposite side of the said supporting means, the body portion having connections from the perforations in the supporting means to the outside of the body portion.

6. In an indicator, a two part body portion, a movable pressure member within the body portion, the body portion having a chamber for communication with the interior of an engine to be tested and adjacent one side of the pressure member and a chamber on the other side of the pressure member and having a duct leading therefrom, a means for providing and controlling the pressure in the second chamber, means for indicating such pressure, a telephone receiver, means electrically connected to the receiver and in position to contact with the pressure member, a timer in the circuit to the receiver and controlled by the operation of the engine for opening and closing said circuit.

7. An indicator comprising a device having a pressure controlled member, a pressure chamber on each of the opposite sides of said pressure controlled member, a connection to one of the chambers and adapted to be connected to the pressure chamber of an engine to be tested, a manually controlled pressure means connected to the other chamber and means for indicating the pressure in said other chamber and means controlled by the movement of the pressure controlled member to indicate when the pressure of the two chambers is equal.

8. An indicator comprising a device having a pressure controlled member, a pressure chamber on each of the opposite sides of said pressure controlled member, a connection to one of the chambers and adapted to be connected to the pressure chamber of an engine to be tested, a manually controlled pressure means connected to the other chamber, means controlled by the movement of the pressure controlled member to indicate when the pressure in one chamber becomes greater or less than the pressure in the other chamber.

9. An indicator comprising a device having a pressure controlled member, a pressure chamber on each of the opposite sides of said pressure controlled member, a connection to one of the chambers and adapted to be connected to the pressure chamber of an engine to be tested, a manually controlled pressure means connected to the other chamber and means for indicating the pressure in said other chamber and means controlled by the movement of the pressure controlled member to indicate when the pressure of the two chambers is equal, said indicating means comprising an electrical circuit with a telephone receiver therein.

10. An indicator comprising a device having a pressure controlled member, a pressure chamber on each of the opposite sides of said pressure controlled member, a connection to one of the chambers and adapted to be connected to the pressure chamber of an engine to be tested, a manually controlled pressure means connected to the other chamber and means for indicating the pressure and means controlled by the movement of the pressure controlled member to indicate when the pressure of the two chambers is equal, said indicating means comprising an electrical circuit and a circuit making and breaking means therein controlled by a moving part of an engine to be tested.

In testimony whereof I affix my signature.

FLOYD B. NEWELL.